Jan. 11, 1966 J. A. MACKER ETAL 3,229,073

SYNCHRONIZED READING APPARATUS

Filed Dec. 12, 1961 3 Sheets-Sheet 1

INVENTORS.
JOHN A. MACKER
RICHARD C. SIMONSEN
BY
Christie, Parker & Hale
ATTORNEYS.

SYNCHRONIZED READING APPARATUS

Filed Dec. 12, 1961 3 Sheets-Sheet 2

Jan. 11, 1966 J. A. MACKER ETAL 3,229,073

SYNCHRONIZED READING APPARATUS

Filed Dec. 12, 1961 3 Sheets-Sheet 3

INVENTORS.
JOHN A. MACKER
RICHARD C. SIMONSEN
BY
Christie, Parker & Hale
ATTORNEYS.

United States Patent Office 3,229,073

Patented Jan. 11, 1966

3,229,073

SYNCHRONIZED READING APPARATUS

John A. Macker, Temple City, and Richard C. Simonsen, Pasadena, Calif., assignors to Burroughs Corporation, Detroit, Mich., a corporation of Michigan Filed Dec. 12, 1961, Ser. No. 158,687
3 Claims. (Cl. 235—61.11)

This invention relates to electro-mechanical reading apparatuses and more particularly to improvements in punched paper card reading units.

Punched paper cards are commonly used for storing digital information in the form of coded perforations arranged in rows and columns. Punched paper card readers are generally known which have a reading station and feed rolls for serially feeding a card into the reading station a column at a time where the information stored in each column of the card is read. Signals corresponding to the information read from the columns of the card are fed into a decoding circuit which in turn develops outputs signals which may be read by other apparatuses such as digital computers. The reading station is generally a continuous reading type of unit which continually reads the card and provides output signals to the decoding circuit even though a column on the card is not exactly in a reading position. Therefore, it is necessary to provide a strobe pulse to indicate when a column of the card is positioned accurately in the reading station to indicate to the connected digital computer or other apparatus that the decoding circuit is now developing usable output signals.

One prior art apparatus for generating strobe pulses has a cam rotatably coupled to the feed rolls for actuating and deactuating contacts of a switch in synchronism with the movement of the card. The opening and closing of the contacts may be used to provide the strobe pulses and, when accurately occurring with respect to the movement of the card, the contact opening and closures indicate the precise time when each column is in a reading position in the reading station. However, this arrangement requires that a card be accurately moved into the feed rolls at the proper angular position of the cams so that a strobe pulse is developed exactly when a column on the card is positioned in a reading position. If cards are accurately fed into the feed rolls with respect to the angular position of the cam, precision mechanical parts are required which increase the cost of a card reading apparatus. Also, cam actuated switches are slow operating, thereby limiting the reading speed of the card reader.

Other systems for providing strobe pulses for card readers are known. By way of example, in one prior art reader a series of photodetection elements are located along the path of the card movement away from the reading station. The photodetection elements are positioned with reference to the reading station such that the leading edge of the card will cover a photodetection element each time one of the columns of the card is in a reading position of the reading station. Such an arrangement eliminates the need for precise feeding of the card into the feed rolls. However, such an arrangement is undesirable in that a large number of expensive photodetection elements are needed and the cost of the card reader is greatly increased over the cam actuated type of reading apparatus. Also, the photodetection elements must be separated by the same distance as the columns are separated on the cards. Therefore, the column density of the cards is limited by the size of the photodetection elements.

In contrast the present invention eliminates the necessity of precisely feeding a card into feed rolls. Also, the present invention greatly reduces the number of photodetection elements necesary for detecting the position of the card. Therefore, the cost of a card reading unit embodying the present invention is greatly reduced over the cam actuated type reading unit. Also, the limitation on column spacing is eliminated.

Briefly, a specific embodiment of the present invention is a reader for perforated cards and has a photoreading station. A feed roll apparatus is arranged for feeding the cards through the reading station a column at a time. A first photodetection element is positioned behind the reading station to detect the leading edge of the card when the first column thereon is approaching the photoreading station. A second photodetection element is positioned ahead of the reading station for detecting the trailing edge of the card when the last column on the card has passed the reading station. A sensing apparatus is provided for providing signals synchronized with the movement of the card. A gating circuit is responsive to the synchronized signals and the detection by the first and second detection elements for providing a plurality of output signals for each column on the card. A counter and output circuits are connected for counting the signals and generating card strobe pulses after a preset number of signals thereby indicating when each column on the card is accurately positioned in the reading station. When the trailing edge of the card is detected the gating circuit stops developing output signals, therefore, the counter stops developing strobe pulses.

These and other aspects of the present invention may be more fully understood with reference to the following description of the figures of which:

Figure 1:
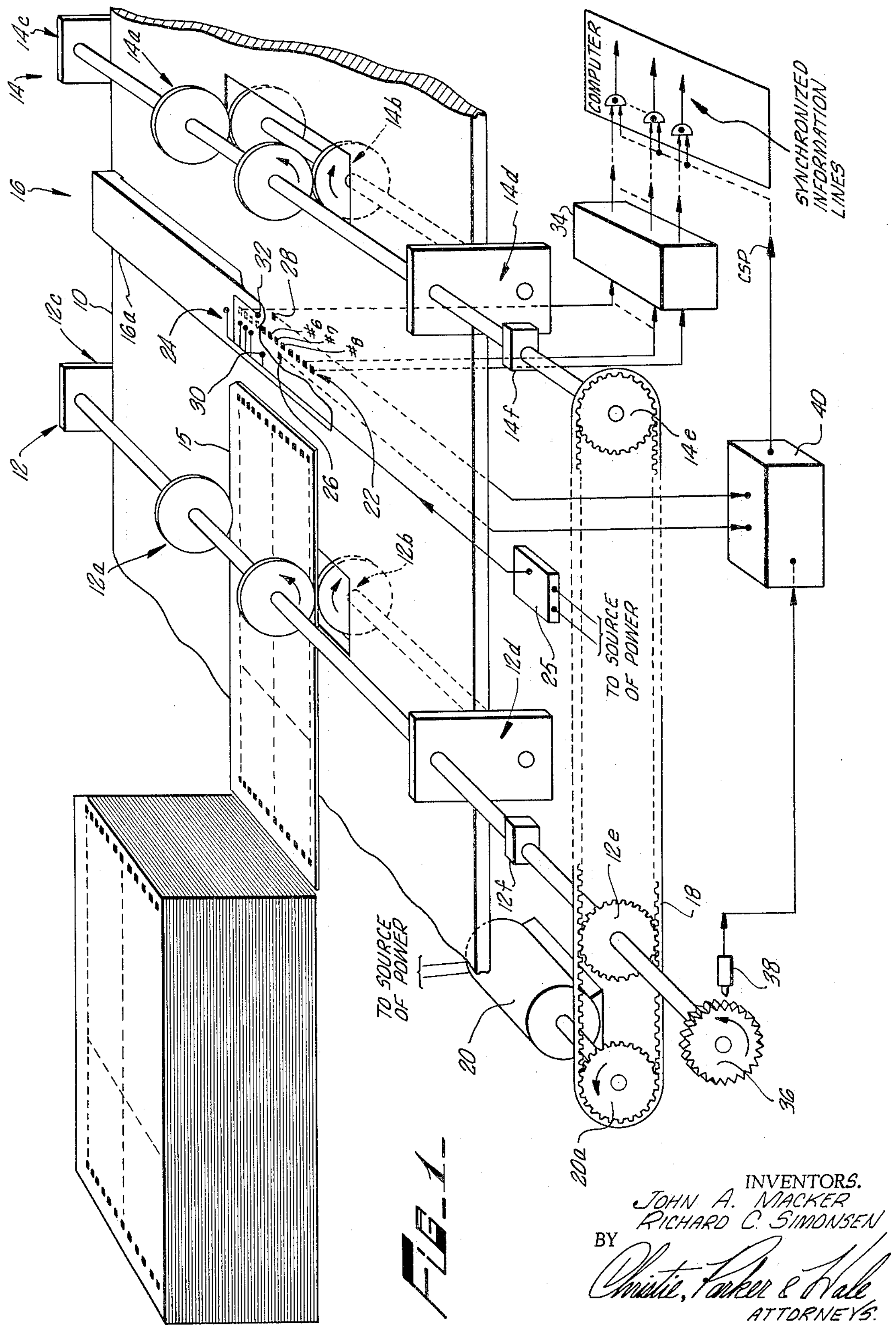
FIGURE 1 is a simplified pictorial view of a portion of card reader with a portion of the reading station broken away to show the photocell reading elements, and embodying the present invention.

Refer now to the mechanical structure of the card reader shown in the simplified pictorial diagram of FIG. 1. The card reader of FIG. 1 includes a card bed 10 and front and rear card feed roll means or units 12 and 14. The front card feed roll means 12 includes an upper pair of feed rolls **12*a* and a lower pair of feed rolls 12*b* for frictionally engaging the upper and lower surfaces of a thin, rectangular shaped record member or paper card 15 and feeding it through a reading station 16. Similar to the feed roll unit 12, the rear feed roll unit 14 has upper and lower pairs of feed rolls 14*a* and 14*b*. The rear card feed roll unit 14 is positioned to the rear of the reading station 16 such that a card 15 fed by the front card feed roll unit 12 through the reading station 16 will engage the rear feed rolls of 14 before the card is disengaged from the front feed rolls of 12. The upper and lower feed rolls 12*a* and 12*b* are rigidly attached to individual shafts which are rotatably connected to bearings 12*c* and 12*d*. The bearings 12*c* and 12*d* are rigidly attached to opposite sides of the card bed 10. The shaft connected to the upper feed rolls 12*a* is also rotatably connected through a gear box 12*f* to a sprocket 12*e*. The sprocket 12*e* has teeth which engage notches in a flexible drive belt 18. Similar to the front card feed roll unit 12, the rear card feed roll unit 14 includes separate shafts connected to the upper and lower feed rolls 14*a* and 14*b* and are rotatably connected to bearings 14*c* and 14*d*. The shaft connected to the upper feed rolls 14*a* is also rotatably connected through a gear box 14*f* to a sprocket 14*e*. The sprocket 14*e* also has teeth which engage the notches of the drive belt 18**.

A motor 20 is provided in the card reader and has a sprocket 20a connected to its output shaft. The sprocket 20a engages the notches of the drive belt 18. The direction of rotation of the output shaft of the motor 20 is such that a card 15 is fed by the front and rear upper feed rolls 12a and 14a through the read station 16 to a card hopper, which is not shown, at the rear of the card reader. The upper feed rolls 12a and 14a exert pressure on the lower feed rolls 12b and 14b, thereby causing them to rotate and tend to move the card to the rear of the card reader. Therefore, the card feed roll means 12 and 14, the motor 20, and the belt 18 form a means for feeding the cards through the reading station 16.

The card 15 is a rectangular shaped paper card and has 80 columns evenly spaced along the length of the card perpendicular to the direction of card movement. The columns are for indicia or rectangular perforations coded to represent information. Each of the columns has 12 possible positions or rows in which the perforations are placed. The rows are evenly spaced apart and are aligned perpendicular to the columns.

The card read station 16 includes twelve photoelectric cells 22 recessed below the surface of the card bed 10. The photoelectric cells 22 are positioned in a straight line parallel with the columns on the card 15, while being moved along the card bed 10. The twelve photoelectric cells 22 are positioned apart the same distance as the twelve rows on the card 15 and are aligned such that each row of the card 15 passes over one of the photoelectric cells 22. Included in the read station 16 and corresponding to the twelve photoelectric cells 22 are twelve lamps 24. The lamps 24 are located in a member 16a of the reading station 16 directly above the corresponding one of the photoelectric cells 22. Only part of the lamps 24 are shown, the rest being in the portion of member 16a which is broken away in FIG. 1. The twelve lamps 24 are arranged such that each lamp illuminates the corresponding one of the photoelectric cells 22. The photoelectric cells 22 and the lamps 24 form information reading means or units for reading the information from the card 15 a column at a time.

Also included in the card read station 16 are two photoelectric cells 26 and 28 for detecting the position of the card 15. The photoelectric cell 26 is recessed below the surface of the card bed 10 and is positioned on the card feed roll unit 12 side of the card read station 16. The photoelectric cell 26 is positioned perpendicular to card travel in between the seventh and eighth photoelectric cells from the end of the photoelectric cells 22 closest to the bearing 12c. The photoelectric cell 28 is also recessed in the card bed 10 but at the card feed roll unit 14 side of the card read station 16. The photoelectric cell 28 is positioned perpendicular to card travel in between the sixth and seventh photoelectric cells from the same end of the photoelectric cells 22 as photoelectric cell 26. A lamp 30 is positioned in the member 16a directly above the photoelectric cell 26. Similarly, a lamp 32 is positioned in the member 16a directly above the photoelectric cell 28. The member 16a is elevated above the card bed 10 to allow a card 15 to be fed in between the lamps and the photoelectric cells. The following discussion will explain in detail that the lamp 30 and the photoelectric cell 26 and the lamp 32 and the photoelectric cell 28 form card detection means or units for detecting the position of the card 15 when the first column on the card 15 is a preselected reference distance from the photoelectric cells 22. It will be observed in FIG. 1 that the two photocells 26 and 28 are centered approximately at the center of the end of the card 15. This arrangement causes the worst case error between the preselected distance and the actual distance between each aperture in the first column and the row of photoelectric cells 22, due to skew of the card, when the edge of the card 15 is detected to be reduced to a minimum. The lamps 24 and 30 and 32 are energized by a power supply 25.

The photoelectric cells 22, 26, and 28 in an actual model of the card reader are solar cells of the type offered for sale by Hoffman Electronics Corporation and offered for sale under the part number 58C.

The output circuits of the photoelectric cells 22 are connected to the input of the decoding circuits 34. The decoding circuit 34 is responsive to the output signals of the twelve photoelectric cells 22 to provide an output signal coded in the desired code for reading by a receiving unit such as a digital computer.

The shaft of the upper feed roll 12a is also connected to a pickup disk or gear 36 made of steel having a low magnetic retentivity. A magnetic pickup unit 38 is positioned for sensing the variations in the magnetic field as the gear 36 rotates and the teeth are moved past the magnetic pickup unit 38. The magnetic pickup unit 38 is a magnetic reading head having a permanent magnet and a coil wound thereon in a well known manner. The teeth of the gear 36 vary the reluctance path around the coil of the pickup unit as they pass adjacent thereto. The output of the sensing unit 38 is connected to the input of a strobe pulse generating circuit 40.

Figure 2:
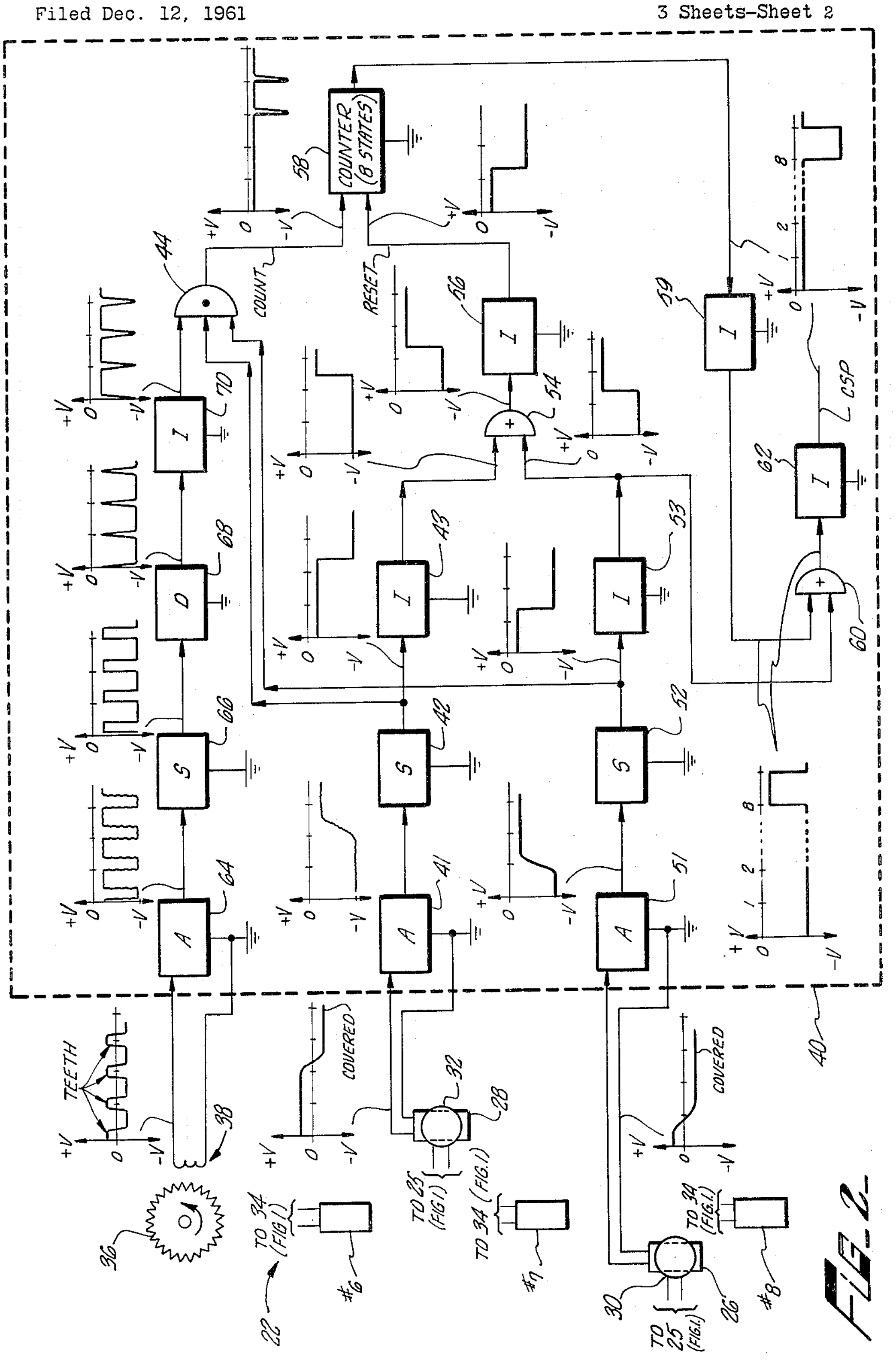
FIGURE 2 is a block diagram of a strobe pulse generating circuit for use in the card reader of FIG. 1.

With the mechanical structure of the card reader of FIG. 1 in mind, refer now to the schematic diagram of the strobe pulse generating circuit 40 shown in FIG. 2. The output circuit of the photoelectric cell 28 is connected to an input circuit of an "or" gate 54 by means of the series connection of an amplifier 41, a switch 42, and an inverter circuit 43. Similarly, the output circuit of the photoelectric cell 26 is connected to another circuit of the "or" gate 54 by means of an amplifier 51, a switch 52, and an inverter circuit 53. The output circuits of the switches 42 and 52 are connected to separate input circuits of an "and" gate 44. The elements including photoelectric detection elements along with the connected circuits including elements 41, 42, 51, and 52 form a means for detecting the position of the card 15.

The output circuit of the "or" gate 54 is connected through an inverter circuit 56 to the reset input circuit of a counter 58. The output circuit of the counter 58 is connected through an inverter circuit 59 to the input circuit of an "or" gate 60. The output circuit of the inverter circuit 53 is also connected to the input circuit of the "or" gate 60. The output circuit of the "or" gate 60 is connected to the input of an inverter circuit 62.

The output circuit of the magnetic pickup unit 38 is connected to an input of the "and" gate 44 by means of the serial connection of an amplifier 64, a switch 66, a differentiating circuit 68, and an inverter circuit 70. The elements 36, 38, 64, 66, 68, and 70 form a means for sensing the movement of the card 15.

The output circuit of the "and" gate 44 is connected to the counting input circuit of the counter 48.

Refer now to the operation of the individual circuits of the block diagram of FIG. 2. The wave shapes of the signals at designated points are shown in FIG. 2.

The photoelectric cells 26 and 28 are responsive to illumination from their respective lamps to generate a small positive voltage output signal. When the photoelectric cells 26 and 28 are blocked off from illumination, they develop a small negative voltage output signal.

The pickup element 38 develops a small positive voltage signal whenever a tooth of the gear 38 is directly in front thereof, and develops a small negative voltage signal in the absence of a tooth in front thereof.

The amplifier circuits 41, 51, and 64 are simple PNP transistor type circuits which have a negative gain. The amplifier circuits 51, 41, and 64 develop a large negative voltage output signal in response to a small positive voltage input signal, and develop a small negative voltage output signal response to a small negative voltage input signal.

The switches 42, 52, and 66 are all identical and are PNP transistor switching circuits. The transistors of the switches are arranged to develop a small negative voltage output signal in response to a large negative voltage input signal and to provide a large negative voltage output signal in response to a small negative voltage input signal. The inverter circuits 43, 53, 56, 59, 62, and 70 are all identical to the switches 42, 52, and 66 and are provided merely for signal inversion.

The differentiating circuit 68 includes a capacitor and a resistor (not shown) connected between the output circuit of the switch 66 and a negative potential so that a positive pulse varying between a large negative voltage signal and a small negative voltage signal causes an extremely narrow positive output pulse varying from a large negative voltage and to a small negative voltage signal.

The "and" gating circuit 44 is responsive to a small negative voltage signal applied at any input circuit to provide a small negative voltage output signal. Also, the "and" gating circuit 44 is responsive to a large negative voltage signal applied at all of the input circuits thereof to develop a large negative voltage output signal. The "or" gates 54 and 60 are responsive to a large negative voltage input signal at either or both of their input circuits to develop a large negative voltage output signal. Otherwise, the output signal of the "or" gates 54 and 60 is a small negative voltage signal.

The counter 58 may be a conventional ring type counter composed of bistable flip-flop circuits and gating circuits which are responsive to large negative voltage input pulses for sequentially stepping from one state of operation to the next. The counter 58 has eight states of operation and automatically recycles back to the first state after eight negative input pulses are applied. Normally the counter 58 develops a small negative voltage output signal. However, after each eight input pulses prior to being recycled to the first state, the counter 58 develops a large negative voltage output pulse.

The counter 58 also includes a conventional reset circuit connected to the output of the inverter circuit 56. The reset circuit of the counter 58 is responsive to a small negative voltage input signal for automatically and immediately resetting all the bistable circuits to an initial state of operation. The counter 58 remains in its initial state of operation until the signal applied at the reset input circuit drops to a large negative voltage signal at which time the counter starts counting the large negative voltage input pulses applied to the counting input circuit thereof as described above.

With the details of the card reader shown in FIGS. 1 and 2 in mind, refer now to its operation. Assume now that power is applied to the motor 20 and the power supply 25 (see FIG. 1). The lamps 24, 30 and 32 are energized and illuminate the corresponding photoelectric cells. Assume that a card is engaged in between the upper and lower feed rolls 12*a* and 12*b* by apparatus, not shown, and not forming a part of this invention. The motor 20, the belt 18, and the card feed roll means 12 feed the card 15 toward the reading station 16.

Before either the photoelectric cell 26 or 28 is blocked off from the illumination by the lamps 30 and 32, they provide a small positive input signal to both the amplifiers 41 and 51, causing large negative output signals. The switches 42 and 52 invert the signals and apply small negative voltage signals to the "and" gate 44. Thus, the "and" gate 44 blocks any signals caused by the gear 36 and pickup element 38 from being applied to the counting input circuit of the counter 58. The inverters 43 and 53 invert the small negative signals from the switches 42 and 52 and apply a large negative signal to "or" gate 54. The "or" gate 54 in turn applies a large negative signal to the inverter 56, causing a small negative signal to be applied to the reset circuit of counter 58. Thus, the counter 58 is reset to its initial state.

Assume now that the leading edge of the card 15 passes over the photoelectric cell 26 but has not as yet reached the photoelectric cell 28. At this point the illumination from the lamp 30 is blocked off from the photoelectric cell 26 but the lamp 32 is still illuminating the photoelectric cell 28. A small positive voltage signal is still applied to the amplifier 41 by the photoelectric cell 28 but now a small negative voltage signal is applied to the amplifier 51 by photoelectric cell 26. The amplifier 51 in turn now applies a small negative voltage signal to the switch 52 causing a large negative input signal to be applied to the "and" gate 44 and the inverter 53. Since the input signal to the inverter 53 is a large negative voltage, a small negative voltage signal is applied to the "or" gate 54 and, therefore, to the inverter 56. The inverter 56 in turn applies a large negative voltage signal to the reset input circuit of the counter 58 and the counter 58 is ready to start counting input pulses. However, the amplifier 41 still applies a large negative voltage signal to the switch 42, causing a small negative voltage input signal to the inverter circuit 43 and the "and" gate 44. Thus, the "and" gate 44 still blocks any pulses caused by the gear 36 and pickup unit 38 from being applied to the counter 58.

Assume now that the card 15 has moved to the point where both the photoelectric cells 26 and 28 are covered and blocked off from illumination. The amplifiers 41 and 51 receive small negative input signals and apply small negative input signals to the switches 42 and 52. Thus, both of the switches 42 and 52 develop large negative voltage output signals and the inverters 43 and 53 develop small negative voltage output signals.

Assume now that a tooth of the gear 36 passes under the magnetic pickup unit 38 causing a small positive going voltage pulse to be applied to the amplifier 64. The amplifier 64 and the switch 66 cause a small positive going pulse to be applied to the input of the differentiating circuit 68. The differentiating circuit 68 applies a narrow positive going pulse to the inverter 70 which inverts the signal and applies a large negative going pulse at the input of the gate 44. Since both the photocells 26 and 28 are covered and the switches 42 and 52 are also developing large negative voltage output signals, the gate 44 allows the negative going pulse from inverter 70 to be applied to the counter 58 and the counter 58 counts from its first state to the next state of operation.

Figure 3:
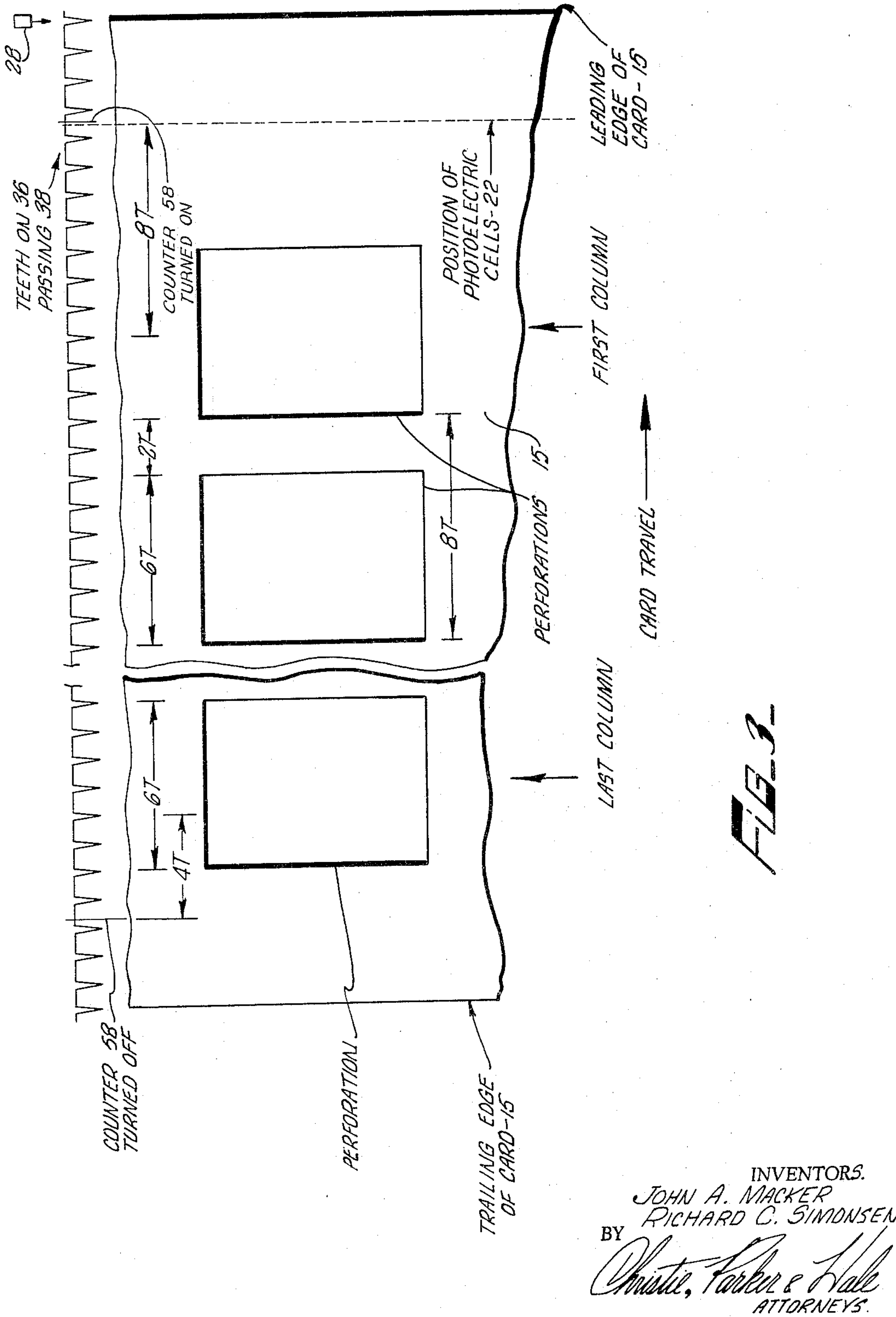
FIGURE 3 is a diagram illustrating the relation of the teeth of the gear passing the pickup element to the movement of the columns on the card being read by the card reader of FIG. 1.

Refer now to FIG. 3 and consider the relation of the count pulses applied to the counter 58 to the position of columns on the card 15 and with respect to the information photoelectric cells 22. FIGURES 3 illustrates the number of teeth of gear 36 passing the pickup unit 38 in relation to the movement of the card 15. FIG. 3 also illustrates the position of the photoelectric cell 28 with respect to the photoelectric cells 22. The gear ratios of 12*f* and 14*f*, and the diametral pitch and the total number of teeth on the gear 36 are such that eight teeth pass the pickup element 38 between the time the leading edge of a perforation of one column reaches an information photocell and the leading edge of a perforation of the next column reaches a photocell. Also as indicated in FIG. 3, the photoelectric cell 28 is positioned with respect to the line of photoelectric cells 22 such that the photoelectric cell 28 is covered by the leading edge of the card 15 (causing the counter 58 to start counting) such that after eight teeth pass the pickup element 38 the first column of perforations on the card 15 is centered over the photoelectric cells 22.

Thus, the photoelectric cell 28 is covered by the leading edge of the card 15 as described hereinabove and the card 15 continues to move ahead while eight pulses are applied to the counter 58 by the gate 44 causing the counter 58 to count through eight states of operation. The eighth count pulse causes the counter 58 to apply a large negative pulse to the inverter 59. The inverter 59 applies a small negative pulse to the input of the "or" gate 60.

Since the inverter 53 is also developing a small negative voltage signal, the "or" gate 60 applies the same signal to the inverter 62 causing a large negative voltage output pulse therefrom. The negative output pulse of the inverter 62 is a card strobe pulse (CSP) which indicates a column on the card 15 is accurately positioned in a reading position over the photoelectric cells 22. The strobe pulse thereby indicates that the decoding circuits 34 are now developing signals indicative of the coded information in the first column on the card 15.

The total number of teeth on the gear 36 are arranged such that six pulses are applied to the input of the counter 58 during the time it takes for an aperture to expose and then completely block off illumination from a photocell. Thus, it may be seen that if the leading edge of the card arrives at the photoelectric cell 28 just after a tooth of gear 36 has passed the magnetic pickup unit 38 the eighth pulse applied to the counter 58 will not occur at the center of the aperture in the first column of the card 15 but will be offset slightly. However, since six pulses occur while one of the apertures in a column of the card 15 exposes one photoelectric cell 22, the counter 58 will count into its eighth state and develop a large negative output pulse while the aperture of the first column still exposes at least part of the photoelectric cell.

The front card feed roll means 12 continues to move the card 15 through the card read station 16. Each time a tooth of the gear 36 passes in front of the magnetic pickup unit 38 the gate 44 applies a count signal to the counter 58, causing it to count to its next state. After eight additional teeth have passed in front of the magnetic pickup unit 38 (after card strobe pulse for the first column) the counter 58 develops another output pulse and a second strobe pulse is developed, thereby indicating the second column on the card 15 is accurately positioned and may be read. This operation continues for each column on the card.

Referring again to FIG. 3, the photoelectric cell 26 is positioned with respect to the photoelectric cells 22 so that after a card strobe pulse (CSP) is developed for the last column on the card 15, and the last column has passed over the center of the photoelectric cells 22, four additional teeth of gear 36 pass pickup unit 38 before the photoelectric cell 26 is uncovered by the trailing edge of the card 15. Assume now that a card strobe pulse has been developed for the last column for the card and the trailing edge of the card 15 moves to a position where the photoelectric cell 26 is exposed to the illumination from the lamp 30, but that the photoelectric cell 28 is still covered by the card 15. With the photoelectric cell 26 exposed to illumination from the lamp 30, the inverter circuit 53 again applies a large negative voltage signal to the input of inverter 62. The large negative voltage signal applied to the gate 60 prevents a small negative signal from being applied to the inverter 62 by the counter 58 and inverter 59 and thereby inhibits any further strobe pulses from being generated. Thus, having read the last column on the card 15, the inverters 59 and 62 and the gate 60 inhibit any further strobe pulses from being generated until another card moves into the card read station 16.

In summary, the detection means including elements 28, 32, 41, and 42 detect the approach of the first column on the card 15 to a reading position centered over the photoelectric cells 22. The detection means including elements 26, 30, 51, and 52 detect the trailing edge of the card after a card strobe pulse is developed for the last column of the card 15.

The inverters 59 and 62 and the gate 60 prevent card strobe pulses from being generated due to spurious signals when the counter 58 is being reset and, therefore, the elements 59, 60, and 62 may be eliminated if the spurious signals are eliminated or an extra strobe pulse can be ignored by the receiving unit. It should be understood that the strobe pulse generating circuit 40 is only one of many electronic circuits which can be used to generate strobe pulses and this invention is not limited to the embodiment shown.

Although the invention has been shown by way of example in a punched paper card reading unit, the invention may be embodied in apparatus for reading other types of record members as well. For example, a reader may be arranged for reading a continuous punched paper tape and embody the present invention. Such a reading unit may employ a perforation at the beginning and the end of each block of information on the tape. Photoelectric cells may then be employed for detecting the beginning and end perforations.

These and other rearrangements of the present invention may be made without departure from the scope of this invention as defined in the following claims.

What is claimed is:

1. A reader for a record card member having a series of substantially evenly spaced columns of coded perforations and leading and trailing edges positioned reference distances from the first and last columns of perforations thereon, the combination of which comprises a reading station and means for serially feeding such a record member column-by-column through the reading station, said reading station including photoreading means for reading each column of perforations on such record member, first photodetection means on one side of said reading means for sensing the presence of the record member and so positioned with respect to the reading means as to provide a signal signifying the passage of the leading edge of the record member thereby in advance of the passage of the first column of perforations past the reading means, and second photodetection means positioned on the other side of the reading means for sensing the presence of the record member and for providing a signal signifying the passage of the trailing edge of the record member thereby; means synchronized with the movement of the record member for developing a plurality of timing signals corresponding to predetermined increments of the advancement of the record member through said reading station; and control circuit means coupled to said first and second photodetection means and including a counter coupled to said synchronizing means and operable when initiated to count the timing signals and to provide a strobe signal as the first and each subsequent column of perforations on the card passes the reading means, said control circuit means further including gating means responsive only to the coincident sensing of the presence of the record member by both said first and second detection means and being responsive to the signal from the first detection means signifying the passage of the leading edge of the record member for initiating the operation of the counter and further being responsive to the signal from the second detection means signifying the passage of the trailing edge of the record member for terminating the operation of the counter.

2. In a reader for cards having perforations therethrough arranged in substantially evenly spaced rows and columns and having the leading edge of the card positioned a reference distance from the first column of perforations thereon, a reading station and means for serially advancing such a card column-by-column through the reading station, said reading station including photoreading means for reading each column of perforations on such card and further including photodetection means on one side of said reading means for sensing the presence of the card and so positioned with respect to the reading means as to provide a signal signifying the passage of the leading edge of the card thereby in advance of the arrival of the first column of perforations at the reading means; means synchronized with the movement of the card for developing a plurality of timing signals corresponding to predetermined increments of the advancement of the card through said reading station; and control circuit means coupled to said photodetection means and including a counter coupled to said synchronizing means and operable when initiated to count the timing signals and to provide a unique output signal after a predetermined number of timing signals occur, the number of such timing signals corresponding substantially to the distance between two adjacent columns of perforations on the card, said control circuit means further including gating means responsive to the signal from the detection means signifying the passage of the leading edge of the card for initiating the operation of the counter so that upon the arrival of the first column of perforations at the reading means the predetermined number of signals will have been counted causing said unique output signal to occur.

3. In a reader for cards having perforations therethrough arranged in substantially evenly spaced rows and columns and having the leading and trailing edges of the card positioned reference distances from the first column and last column of perforations thereon, a reading station and means for serially advancing such a card column-by-column through the reading station, said reading station including photoreading means for reading each column of perforations on such card and further including first photodetection means on one side of said reading means for sensing the presence of the card and so positioned with respect to the reading means as to provide a first signal signifying the passage of the leading edge of the card thereby in advance of the arrival of the first column of perforations at the reading means and a second signal signifying the passage of the trailing edge of the card and second photodetection means positioned on the other side of said reading means for sensing the presence of the card and positioned for providing a signal signifying the passage of the trailing edge of the card after the last column of perforations arrive at said reading station, means synchronized with the movement of the card for providing a plurality of timing signals corresponding to predetermined increments of advancement of the card through said reading station; and control circuit means including a counter coupled to said synchronizing means and operable when initiated to count the timing signals and to provide a unique output signal after a predetermined number of timing signals occur, the number of such timing signals corresponding substantially to the distance between two adjacent columns of perforations on the card, said counter including a reset circuit and being operative upon receipt of a control signal at said reset circuit for resetting to an initial state such that upon initiation of the operation thereof the first unique output signal is formed as the first column of perforations arrives at the reading means, said control circuit means further including first gating means responsive to the coincidence of the sensing of the presence of a card by said second photodetection means and the first signal from the first photodetection means signifying the passage of the leading edge of the card for initiating the operation of the counter and second gating means coupled to the first photodetection means and operative for applying a control signal to said reset circuit in response to the second signal signifying the passage of the trailing edge of the card for causing the counter to be reset to said initial state ready for the arrival of another card.

References Cited by the Examiner

UNITED STATES PATENTS

| | | | |
|---|---|---|---|
| 2,624,786 | 1/1953 | Potter | 235—61.115 |
| 2,789,224 | 4/1957 | Leonard | 340—174.1 |
| 2,848,535 | 8/1958 | Hunt | 235—61.11 |

ROBERT C. BAILEY, *Primary Examiner.*

DARYL W. COOK, *Examiner.*